United States Patent
Ross et al.

(10) Patent No.: US 11,755,895 B2
(45) Date of Patent: Sep. 12, 2023

(54) ROTATING DATA FOR NEURAL NETWORK COMPUTATIONS

(71) Applicant: Google LLC, Mountain View, CA (US)

(72) Inventors: Jonathan Ross, Mountain View, CA (US); Gregory Michael Thorson, Waunakee, WI (US)

(73) Assignee: Google LLC, Mountain View, CA (US)

( * ) Notice: Subject to any disclaimer, the term of this patent is extended or adjusted under 35 U.S.C. 154(b) by 110 days.

(21) Appl. No.: 17/520,919

(22) Filed: Nov. 8, 2021

(65) Prior Publication Data
US 2022/0172033 A1    Jun. 2, 2022

Related U.S. Application Data

(63) Continuation of application No. 16/857,808, filed on Apr. 24, 2020, now Pat. No. 11,170,291, which is a
(Continued)

(51) Int. Cl.
*G06N 3/063* (2023.01)
*G06N 5/04* (2023.01)
(Continued)

(52) U.S. Cl.
CPC ......... *G06N 3/063* (2013.01); *G06F 15/8046* (2013.01); *G06N 3/045* (2023.01); *G06N 3/08* (2013.01); *G06N 5/04* (2013.01)

(58) Field of Classification Search
None
See application file for complete search history.

(56) References Cited

U.S. PATENT DOCUMENTS

| 5,014,235 A | 5/1991 | Morton |
| 5,136,717 A | 8/1992 | Morley et al. |

(Continued)

FOREIGN PATENT DOCUMENTS

| CN | 104035751 | 9/2014 |
| EP | 0422348 | 4/1991 |

(Continued)

OTHER PUBLICATIONS

2013 IEEE 20th International Conference on Electronics, Circuits, and Systems (ICECS), IEEE, Dec. 8, 2013, pp. 221-224.
(Continued)

*Primary Examiner* — Daniel T Pellett
(74) *Attorney, Agent, or Firm* — Fish & Richardson P.C.

(57) ABSTRACT

Methods, systems, and apparatus, including computer programs encoded on computer storage media, for computing a layer output for a convolutional neural network layer, the method comprising: receiving a plurality of activation inputs; forming a plurality of vector inputs from the plurality of activation inputs, each vector input comprising values from a distinct region within the multi-dimensional matrix; sending the plurality of vector inputs to one or more cells along a first dimension of the systolic array; generating a plurality of rotated kernel structures from each of the plurality of kernel; sending each kernel structure and each rotated kernel structure to one or more cells along a second dimension of the systolic array; causing the systolic array to generate an accumulated output based on the plurality of value inputs and the plurality of kernels; and generating the layer output from the accumulated output.

15 Claims, 11 Drawing Sheets

Related U.S. Application Data continuation of application No. 15/792,872, filed on Oct. 25, 2017, now Pat. No. 11,210,580, which is a continuation of application No. 14/845,022, filed on Sep. 3, 2015, now Pat. No. 9,805,303.

(60) Provisional application No. 62/164,998, filed on May 21, 2015.

(51) Int. Cl.
*G06N 3/08* (2023.01)
*G06N 3/045* (2023.01)
*G06F 15/80* (2006.01)

(56) References Cited

U.S. PATENT DOCUMENTS

| | | | |
|---|---|---|---|
| 5,138,695 | A | 8/1992 | Means et al. |
| 5,146,543 | A | 9/1992 | Vassiliadis et al. |
| 5,337,395 | A | 8/1994 | Vassiliadis et al. |
| 5,471,627 | A | 11/1995 | Means et al. |
| 5,544,336 | A | 8/1996 | Kato et al. |
| 5,799,134 | A | 8/1998 | Chiueh et al. |
| 5,812,993 | A | 9/1998 | Ginosar et al. |
| 6,038,337 | A | 3/2000 | Lawrence et al. |
| 6,184,753 | B1 | 2/2001 | Ishimi et al. |
| 7,136,710 | B1 | 11/2006 | Hoffberg et al. |
| 8,184,696 | B1 | 5/2012 | Chirila-Rus et al. |
| 8,468,109 | B2 | 6/2013 | Moussa et al. |
| 8,924,455 | B1 | 12/2014 | Barman et al. |
| 2005/0044053 | A1 | 2/2005 | Moreno et al. |
| 2007/0022063 | A1 | 1/2007 | Lightowler |
| 2007/0086655 | A1 | 4/2007 | Simard et al. |
| 2008/0319933 | A1 | 12/2008 | Moussa et al. |
| 2011/0029471 | A1 | 2/2011 | Chakradhar et al. |
| 2014/0142929 | A1 | 5/2014 | Seide et al. |
| 2014/0180989 | A1 | 6/2014 | Krizhevsky et al. |
| 2014/0288928 | A1 | 9/2014 | Penn et al. |
| 2014/0337262 | A1 | 11/2014 | Kato et al. |
| 2016/0267111 | A1 | 9/2016 | Shoaib et al. |
| 2017/0103310 | A1 | 4/2017 | Henry et al. |

FOREIGN PATENT DOCUMENTS

| | | |
|---|---|---|
| EP | 3064130 | 9/2016 |
| TW | 201232429 | 8/2012 |
| TW | 201331855 | 8/2013 |

OTHER PUBLICATIONS

Beamer et al., "Ivy Bridge Server Graph Processing Bottlenecks," The First International Workshop Computer Architecture for Machine Learning, Jun. 2015, 56 pages.

Bo et al., "String Kernel Testing Acceleration Using Micron's Automata Processor," The First International Workshop Computer Architecture for Machine Learning, Jun. 2015, 21 pages.

Carlo et al., "An Area-Efficient 2-D Convolution Implementation on FPGA for Space Applications," IEEE Computer Society, Dec. 11, 2011, 7 pages.

Chen et al., "Hardware Acceleration for Neuromorphic Computing—An Evolving View," The First International Workshop Computer Architecture for Machine Learning, Jun. 2015, 38 pages.

Chillet et al., "A Neural Network Model for Real-Time Scheduling on Heterogeneous SoC Architectures," Proceedings of International Joint Conference on Neural Networks, Aug. 2007, pp. 102-107.

Cornu et al., "Design, Implementation, and Test of a Multi-Model Systolic Neural-Network Accelerator," Scientific Programming—Parallel Computing Projects of the Swiss Priority Programme, Jan. 1, 1996, 5(1):47-61.

Dawwd, "The multi 2D systolic design and implementation of Convolutional Neural Networks," Dec. 2013, pp. 221-224.

Dielman et al., "Rotation-invariant convolutional neural networks for galaxy morphology prediction," Monthly notices of the royal astronomical society, 2015, pp. 1441-1459.

Farabet et al., "Hardware Accelerated Convolutional Neural Networks for Synthetic Vision Systems," Circuits and Systems (ISCAS), Proceedings of 2010 IEEE International Symposium on, May-Jun. 2010, pp. 257-260.

Ginosar, "Accelerators for Machine Learning of Big Data," The First International Workshop Computer Architecture for Machine Learning, Jun. 2015, 13 pages.

Gokhale, "Enabling Machines to Understand our World," The First International Workshop Computer Architecture for Machine Learning, Jun. 2015, 18 pages.

Graf et al., "A Massively Parallel Digital Learning Processor," Proceedings of the 22nd annual conference on Neural Information Processing Systems (NIPS), Dec. 2008, 8 pages.

Hecht et al., "An advanced programmable 2D-convolution chip for, real time image processing," Signal Image and Video Processing, Jun. 11, 1991, pp. 1897-1900.

Henriques et al. "Exploiting the circulant structure of tracking-by-detection with kernels," European conference on computer vision, 2012, 14 pages.

Indiveri, "Neuromorphic circuits for building autonomous cognitive systems," The First International Workshop Computer Architecture for Machine Learning, Jun. 2015, 37 pages.

International Preliminary Report on Patentability issued in International Application No. PCT/US2016/030536, dated Nov. 30, 2017, 11 pages.

International Search Report and Written Opinion in International Application No. PCT/US2016/029294, dated Sep. 1, 2016, 13 pages.

International Search Report and Written Opinion in International Application No. PCT/US2016/029965, dated Sep. 1, 2016, 13 pages.

International Search Report and Written Opinion in International Application No. PCT/US2016/029968, dated Sep. 1, 2016, 14 pages.

International Search Report and Written Opinion in International Application No. PCT/US2016/029986, dated Sep. 1, 2016, 13 pages.

International Search Report and Written Opinion in International Application No. PCT/US2016/030515, dated Aug. 25, 2016, 19 pages.

International Search Report and Written Opinion in International Application No. PCT/US2016/030536, dated Aug. 31, 2016, 17 pages.

Kane, "An instruction systolic array architecture for multiple neural network types," Loughborough University, Doctoral Thesis, Sep. 1998, 315 pages.

Khan et al., "Systolic architectures for artificial neural nets," Neural Networks, Nov. 1991, pp. 620-627.

Kim et al. "Efficient Hardware Architecture for Sparse Coding," IEEE Transactions on Signal Processing 62.16, Aug. 15, 2014, 14 pages.

Kim et al., "A Large-Scale Architecture for Restricted Boltzmann Machines," Field-Programmable Custom Computing Machines (FCCM), 2010 18th IEEE Annual International Symposium on, IEEE, May 2, 2010, pp. 201-208.

Krizhevsky et al., "ImageNet classification with deep convolutional neural networks," The 26th annual conference on Neural Information Processing Systems (NIPS'25), Dec. 2012, 9 pages.

Kung et al., "Two-level pipelined systolic array for multidimensional convolution," Image and Vision Computing, Feb. 2, 1983, 1(1):30-36.

Kung, "VLSI Array Processors," IEEE ASSP Magazine, Jul. 1, 1985, 2(3):4-22.

Lee et al., "Implementation of the Super-Systolic Array for Convolution," Design Automation Conference, Jan. 2003, pp. 491-494.

Lee et al., "Nonlinear image processing by a rotating kernel transformation," Optics letters 15.23, 1990, pp. 1383-1385.

Lehmann et al., "A generic systolic array building block for neural networks with on-chip learning," Neural Networks, IEEE Transactions on, May 1993, 4(3):400-407.

(56) References Cited

OTHER PUBLICATIONS

Lipasti et al., Mimicking the Self-Organizing Properties of the Visual Cortex, The First International Workshop Computer Architecture for Machine Learning, Jun. 2015, 23 pages.
Lo et al. "Artificial convolutional neural network for medical image pattern recognition," Neural networks 8.7, 1995, pp. 1201-1214.
Mahapatra et al., "Mapping of Neural Network Models onto Systolic Arrays," Journal of Parallel and Distributed Computing 60, Jan. 2000, 677-689.
Merolla et al. "A digital Neurosynaptic Core Using Embedded Crossbar Memory with 45pJ per Spike in 45nm," IEEE CICC, Sep. 19, 2011, 4 pages.
Office Action in Taiwanese Application No. 105115859, dated Nov. 16, 2016, 10 pages.
Ovtcharov et al., "Accelerating Deep Convolutional Neural Networks Using Specialized Hardware in the Datacenter," The First International Workshop Computer Architecture for Machine Learning, Jun. 2015, 33 pages.
Patil et al., "Hardware Architecture for Large Parallel Array of Random Feature Extractors applied to Image Recognition," arXiv, Dec. 24, 2015, 18 pages.
Pearce, "You Have No (Predictive) Power Here, SPEC!" The First International Workshop Computer Architecture for Machine Learning, Jun. 2015, 15 pages.
Rojas, "Hardware for Neural Networks," Neural Networks, 1996, pp. 451-478.
Shaaban, "Systolic Architectures," PowerPoint Presentation, Mar. 2003, 9 pages.
Shapri et al., "Performance Analysis of Two-Dimensional Systolic Array Matrix Multiplication with Orthogonal Interconnections," International Journal on New Computer Architectures and Their Applications (IJNCAA), Dec. 2011, 1(3):1066-1075.
Shapri et al., "Performance Analysis of Two-Dimensional Systolic Array Matrix Multiplication with Orthogonal Interconnections," International Journal on New Computer Architectures and Their Applications, 2001, 1(3):1090-1000.
Smith, "Biologically Plausible Spiking Neural Networks," The First International Workshop Computer Architecture for Machine Learning, Jun. 2015, 77 pages.
Sudha et al., "Systolic array realization of a neural network-based face recognition system," Industrial Electronics and Applications, ICIEA 2008, 3rd IEEE Conference on, pp. 1864-1869.
TW Office Action in Taiwanese Application No. 107115823, dated Jan. 16, 2020, 4 pages (translation only).
Wong et al., "A New Scalable Systolic Array Processor Architecture for Discrete Convolution," College of Engineering at the University of Kentucky, Master Thesis, 2003, 175 pages.
Wu et al., "Flip-Rotate-Pooling Convolution and Split Dropout on Convolution Neural Networks for Image Classification," arXiv, Jul. 31, 2015, 9 pages.
Yiping et al. "A High Performance Digital Neural Processor Design by Network on Chip Architecture," IEEE VLSI Design, Automation and Test, Apr. 25, 2011, 4 pages.

ROTATING DATA FOR NEURAL NETWORK COMPUTATIONS

CROSS REFERENCE TO RELATED APPLICATIONS

This application is a continuation of U.S. application Ser. No. 16/857,808, filed Apr. 24, 2020, which is a continuation of U.S. application Ser. No. 15/792,872, filed Oct. 25, 2017, which is a continuation of U.S. application Ser. No. 14/845,022, filed Sep. 3, 2015, which claims the benefit of U.S. Provisional Patent Application No. 62/164,998, filed on May 21, 2015, the entire contents of each are hereby incorporated by reference.

BACKGROUND

This specification relates to computing neural network inferences in hardware.

Neural networks are machine learning models that employ one or more layers of models to generate an output, e.g., a classification, for a received input. Some neural networks include one or more hidden layers in addition to an output layer. The output of each hidden layer is used as input to the next layer in the network, i.e., the next hidden layer or the output layer of the network. Each layer of the network generates an output from a received input in accordance with current values of a respective set of parameters.

Some neural networks include one or more convolutional neural network layers. Each convolutional neural network layer has an associated set of kernels. Each kernel includes values established by a neural network model created by a user. In some implementations, kernels identify particular image contours, shapes, or colors. Kernels can be represented as a matrix structure of weight inputs. Each convolutional layer can also process a set of activation inputs. The set of activation inputs can also be represented as a matrix structure.

Some existing systems perform computations for a given convolutional layer in software. For example, the software can apply each kernel for the layer to the set of activation inputs. That is, for each kernel, the software can overlay the kernel, which can be represented multi-dimensionally, over a first portion of activation inputs, which can be represented multi-dimensionally. The software can then compute a dot product from the overlapped elements. The dot product can correspond to a single activation input, e.g., an activation input element that has an upper-left position in the overlapped multi-dimensional space. For example, using a sliding window, the software then can shift the kernel to overlay a second portion of activation inputs and calculate another dot product corresponding to another activation input. The software can repeatedly perform this process until each activation input has a corresponding dot product. In some implementations, the dot products are input to an activation function, which generates activation values. The activation values can be combined, e.g., pooled, before being sent to a subsequent layer of the neural network.

One way of computing convolution calculations requires numerous matrix multiplications in a large dimensional space. A processor can compute matrix multiplications through a brute force method. For example, although compute-intensive and time-intensive, the processor can repeatedly calculate individual sums and products for convolution calculations. The degree to which the processor parallelizes calculations is limited due to its architecture.

SUMMARY

In general, this specification describes a special-purpose hardware circuit that computes neural network inferences.

In general, one innovative aspect of the subject matter described in this specification can be embodied in methods that include the actions of computing a layer output for a convolutional neural network layer from a layer input for the convolutional neural network layer using a two-dimensional systolic array, the convolutional neural network layer having a plurality of kernels, each kernel having a respective matrix structure of weights, the method comprising: receiving a plurality of activation inputs, the plurality of activation inputs represented as a multi-dimensional matrix; forming a plurality of vector inputs from the plurality of activation inputs, each vector input comprising values from a distinct region within the multi-dimensional matrix; sending the plurality of vector inputs to one or more cells along a first dimension of the systolic array; generating a plurality of rotated kernel structures from each of the plurality of kernels, where generating a particular rotated kernel structure comprises shifting elements in the respective matrix structure for the kernel along one dimension; sending each kernel structure and each rotated kernel structure to one or more cells along a second dimension of the systolic array; causing the systolic array to generate an accumulated output based on the plurality of value inputs and the plurality of kernels; and generating the layer output from the accumulated output.

Implementations can include one or more of the following features. The first dimension of the systolic array corresponds to rows of the systolic array, and where the second dimension of the systolic array corresponds to columns of the systolic array. Sending the plurality of vector inputs to one or more cells comprises: sending, for a particular row of the systolic array, a respective element from each vector input to the particular row; and selecting, at each cell in the particular row, one of the respective elements for storage in a register in the cell based on a multiplexor control signal. Sending the plurality of vector inputs to one or more cells along a first dimension of the systolic array comprises: sending each vector input to a distinct series of shift registers, each shift register shifting an element of the vector input to a subsequent shift register on a subsequent clock cycle, each shift register corresponding to a respective row in the systolic array; and selecting, for each row, an output from the corresponding shift registers for use in the row. Forming a plurality of vector inputs from the plurality of activation inputs is based on a size of a particular kernel structure, further comprising: overlapping the particular kernel structure with the matrix representation of the plurality of activation inputs to form a first vector input from elements in the matrix representation; forming one or more other vector inputs from other elements that surround the overlapped particular kernel structure. Generating the layer output from the accumulated output comprises normalizing and pooling the accumulated output to generate the layer output. Sending the plurality of vector inputs to one or more cells along a first dimension of the systolic array comprises: at a particular clock cycle, storing a first vector input in the plurality of vector inputs in a first cell of the systolic array; and at a subsequent clock cycle, shifting the first vector input in the first cell to a second cell that is adjacent to the first cell and storing a second vector input in the plurality of vector inputs in the first cell.

Particular embodiments of the subject matter described in this specification can be implemented so as to realize one or more of the following advantages. Rotating activation inputs and weight inputs to a neural network processor can cause the hardware circuit to process inferences for neural networks having convolutional layers more efficiently. In particular, multiple convolution calculations can be performed in parallel. This allows a systolic array within the neural network process to be more fully utilized during each clock cycle. Rotations can also permit better usage of registers in processors, e.g., CPUs and GPUs, which can improve performance. Rotations can also reduce power usage by reducing a number of cache fetches.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

A neural network having multiple layers can be used to compute inferences. For example, given an input, the neural network can compute an inference for the input. The neural network computes this inference by processing the input through each of the layers of the neural network. In particular, the layers of the neural network are arranged in a sequence, each with a respective set of weights. Each layer receives an input and processes the input in accordance with the set of weights for the layer to generate an output.

Therefore, in order to compute an inference from a received input, the neural network receives the input and processes it through each of the neural network layers in the sequence to generate the inference, with the output from one neural network layer being provided as input to the next neural network layer. Data inputs to a neural network layer, e.g., either the input to the neural network or the outputs of the layer below the layer in the sequence, can be referred to as activation inputs to the layer. Activation inputs can be represented as a matrix structure of activation values. This matrix structure is described further below in reference to FIG. 6.

In some implementations, the layers of the neural network are arranged in a directed graph. That is, any particular layer can receive multiple inputs, multiple outputs, or both. The layers of the neural network can also be arranged such that an output of a layer can be sent back as an input to a previous layer. In some implementations, at least one of the layers of the neural network is a convolutional layer.

Figure 1:
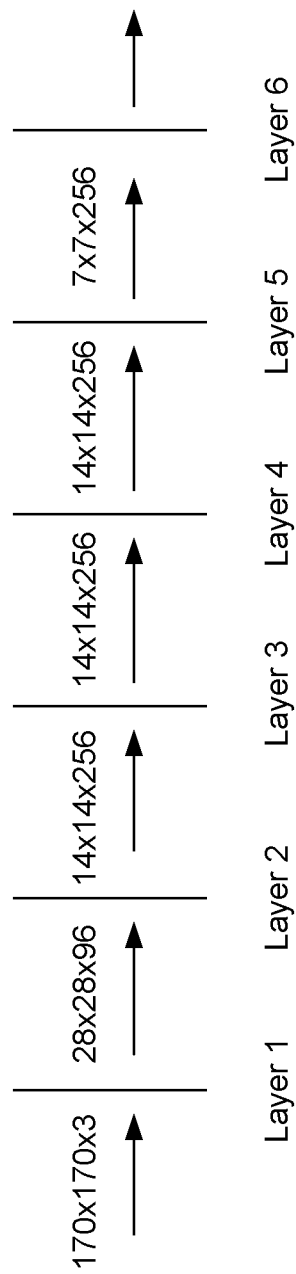
FIG. 1 shows an example neural network having multiple layers.

FIG. 1 shows an example neural network 100 having multiple layers. Each layer can process an input of a particular size and generate an output of another size. By way of illustration, Layer 1 can process a 170×170×3 image and output a 28×28×96 matrix of activation values. The 28×28×96 matrix of activation values is processed by Layers 2-6, and the output of Layer 6 can be used to generate an inference of the neural network. Layers 1-3 can be convolutional layers. These matrices will be described further below in reference to FIG. 6.

As described above, a convolutional neural network layer can have an associated set of kernels. Each kernel includes a set of weight inputs, which when applied to activation inputs of the layer, can cause activation values to be generated, which can be used to generate an output for the layer. In some implementations, applying weight inputs to activation inputs includes performing a dot product of each weight input with a portion of activation inputs. Computing activation values, e.g., the 28×28×96 matrix of activation values, for a convolutional layer is described further below in reference to FIG. 7.

Figure 2:
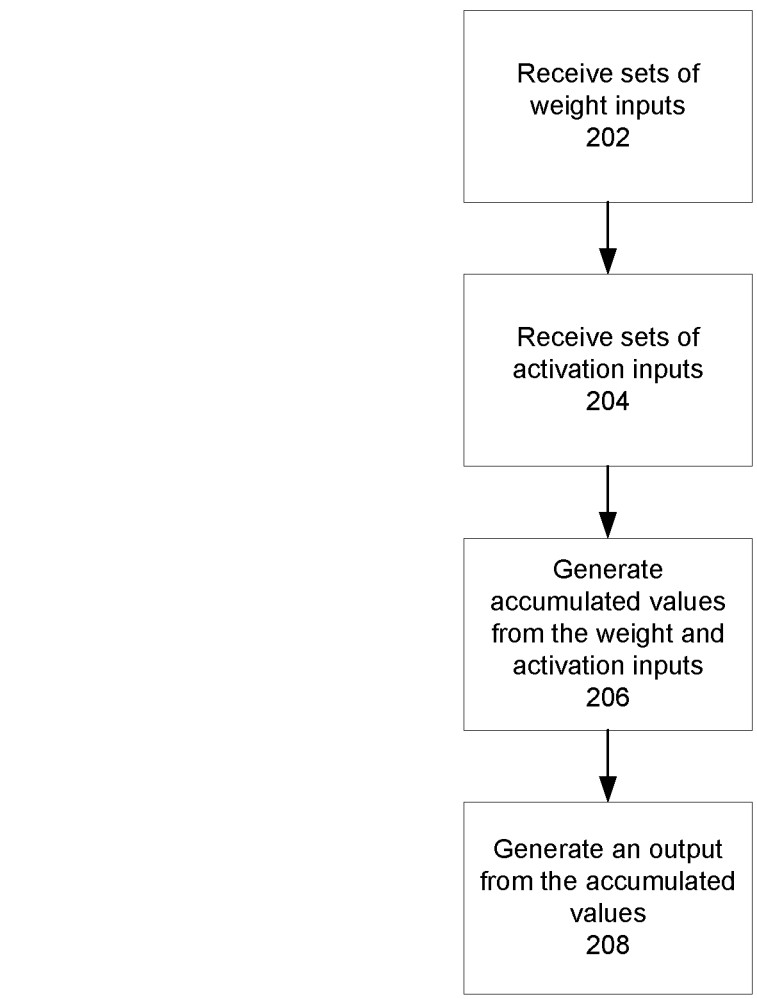
FIG. 2 is a flow diagram of an example method for performing a computation for a given layer of a neural network.

FIG. 2 is a flow diagram of an example process 200 for performing a computation for a given layer of a neural network using a special-purpose hardware circuit. For convenience, the method 200 will be described with respect to a system having one or more circuits that performs the method 200. The process 200 can be performed for each layer of the neural network in order to compute an inference from a received input.

The system receives sets of weight inputs (step 202) and sets of activation inputs (step 204) for the given layer. The sets of weight inputs and the sets of activation inputs can be received from dynamic memory and a unified buffer, respectively, of the special-purpose hardware circuit. In some implementations, both the sets of weight inputs and the sets of activation inputs can be received from the unified buffer.

The system generates accumulated values from the weight inputs and the activation inputs using a matrix multiplication unit of the special-purpose hardware circuit (step 206). In some implementations, the accumulated values are dot products of the sets of weight inputs and the sets of activation inputs. That is, for one set of weights, the system can multiply each weight input with each activation input and sum the products together to form an accumulated value. The system can then compute dot products of other set of weights with other sets of activation inputs. This will be described further below in reference to FIG. 7.

The system can generate a layer output from the accumulation values (step 208) using a vector computation unit of the special-purpose hardware circuit. In some implementations, the vector computation unit applies an activation function to the accumulated values. The output of the layer can be stored in the unified buffer for use as an input to a subsequent layer in the neural network or can be used to determine the inference. The system finishes processing the neural network when a received input has been processed through each layer of the neural network to generate the inference for the received input.

Figure 3:
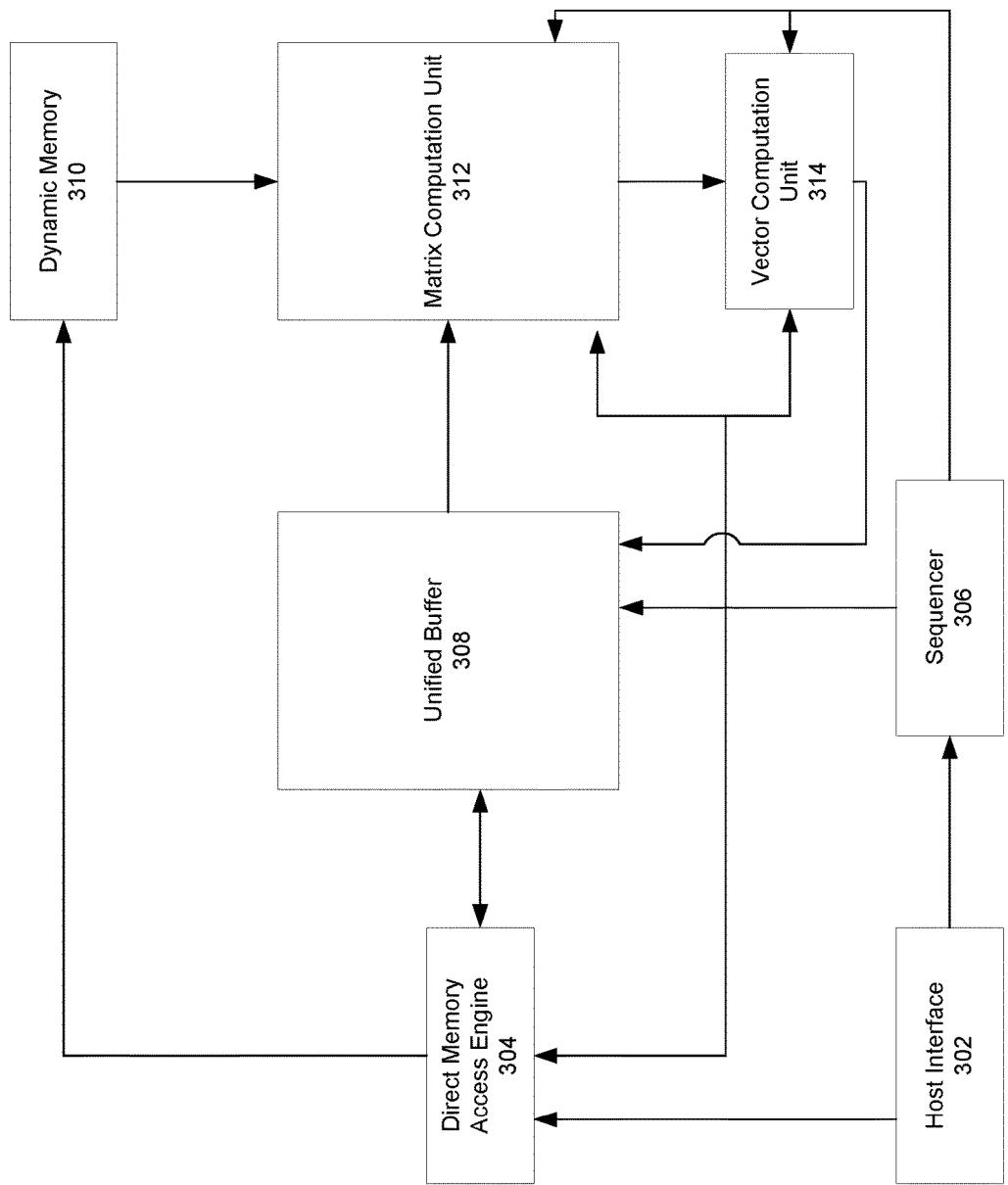
FIG. 3 shows an example neural network processing system.

FIG. 3 shows an example special-purpose integrated circuit 300 for performing neural network computations. The system 300 includes a host interface 302. The host interface 302 can receive instructions that include parameters for a neural network computation. The parameters can include at least one or more of the following: how many layers should be processed, corresponding sets of weight inputs for each layer of the layer, an initial set of activation inputs, i.e., the input to the neural network from which the inference is to be computed, corresponding input and output sizes of each layer, a stride value for the neural network computation, and a type of layer to be processed, e.g., a convolutional layer or a fully connected layer.

The host interface 302 can send the instructions to a sequencer 306, which converts the instructions into low level control signals that control the circuit to perform the neural network computations. In some implementations, the control signals regulate dataflow in the circuit, e.g., how the sets of weight inputs and the sets of activation inputs flow through the circuit. The sequencer 306 can send the control signals to a unified buffer 308, a matrix computation unit 312, and a vector computation unit 314.

In some implementations, the sequencer 306 also sends control signals to a direct memory access engine 304 and dynamic memory 310. In some implementations, the sequencer 306 is a processor that generates clocked signals. The sequencer 306 can use timing of the clocked signals to, at appropriate times, send the control signals to each component of the circuit 300. In some other implementations, the host interface 302 passes in a clocked signal from an external processor.

The host interface 302 can send the sets of weight inputs and the initial set of activation inputs to the direct memory access engine 304. The direct memory access engine 304 can store the sets of activation inputs at the unified buffer 308. In some implementations, the direct memory access stores the sets of weights to dynamic memory 310, which can be a memory unit. In some implementations, the dynamic memory is located off of the circuit.

The unified buffer 308 is a memory buffer. It can be used to store the set of activation inputs from the direct memory access engine 304 and outputs of the vector computation unit 314. The direct memory access engine 304 can also read the outputs of the vector computation unit 314 from the unified buffer 308.

The dynamic memory 310 and the unified buffer 308 can send the sets of weight inputs and the sets of activation inputs, respectively, to the matrix computation unit 312. In some implementations, the matrix computation unit 312 is a two-dimensional systolic array. The matrix computation unit 312 can also be a one-dimensional systolic array or other circuitry that can perform mathematical operations, e.g., multiplication and addition. In some implementations, the matrix computation unit 312 is a general purpose matrix processor. The matrix computation unit 312 will be described in more detail below with reference to FIG. 4 and FIG. 5.

The matrix computation unit 312 can process the weight inputs and the activation inputs and provide a vector of outputs to the vector computation unit 314. In some implementations, the matrix computation unit sends the vector of outputs to the unified buffer 308, which sends the vector of outputs to the vector computation unit 314. The vector computation unit can process the vector of outputs and store a vector of processed outputs to the unified buffer 308. For example, the vector computation unit 314 can apply a non-linear function to outputs of the matrix computation unit, e.g., a vector of accumulated values, to generate activated values. In some implementations, the vector computation unit 314 generates normalized values, pooled values, or both. The vector of processed outputs can be used as activation inputs to the matrix computation unit 312, e.g., for use in a subsequent layer in the neural network.

Figure 4:
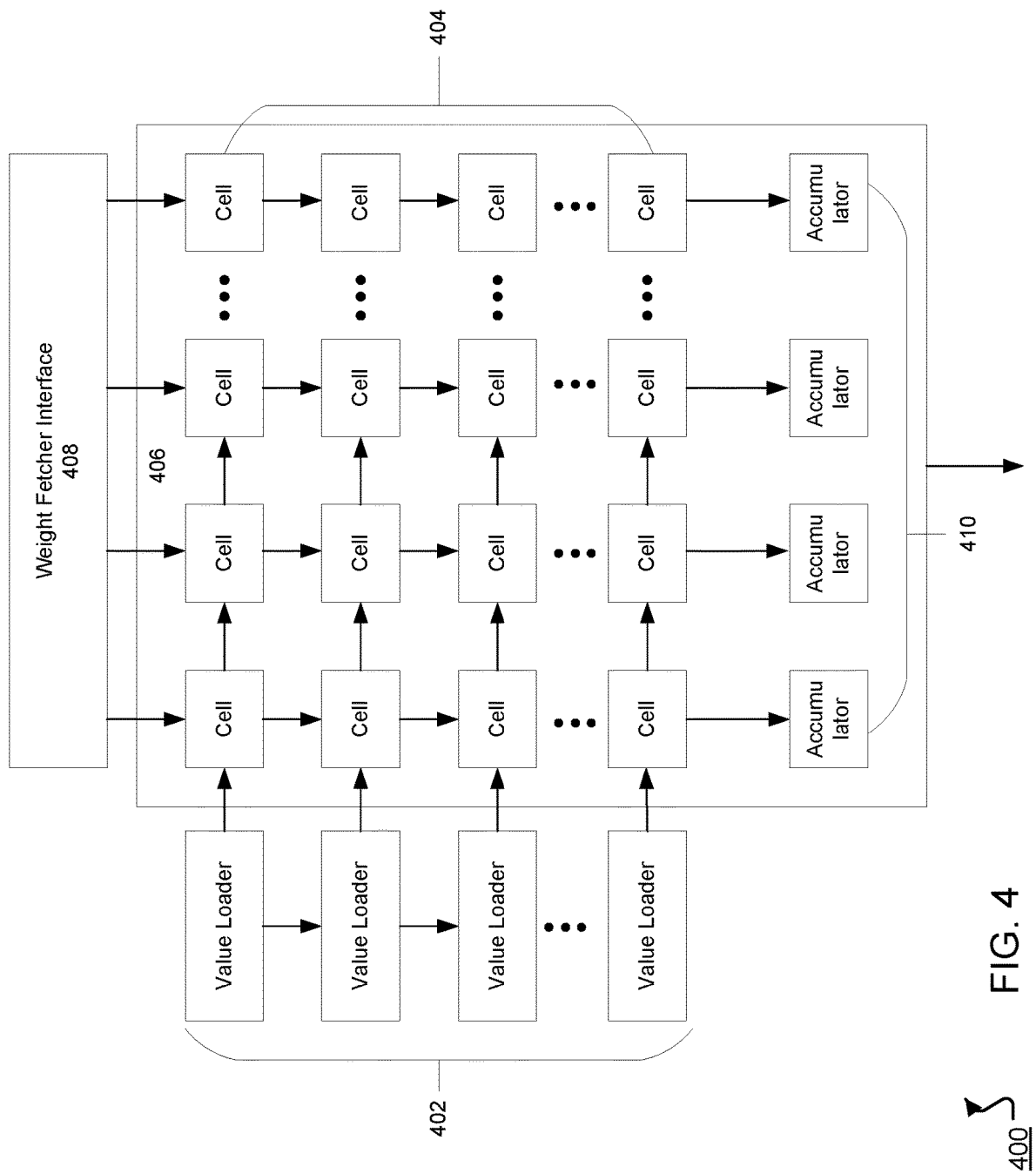
FIG. 4 shows an example architecture including a matrix computation unit.

FIG. 4 shows an example architecture 400 including a matrix computation unit. The matrix computation unit is a two-dimensional systolic array 406. The array 406 includes multiple cells 404. In some implementations, a first dimension 420 of the systolic array 406 corresponds to columns of cells and a second dimension 422 of the systolic array 406 corresponds to rows of cells. The systolic array can have more rows than columns, more columns than rows, or an equal number of columns and rows.

In the illustrated example, value loaders 402 send activation inputs to rows of the array 406 and a weight fetcher interface 408 sends weight inputs to columns of the array 406. In some other implementations, however, activation inputs are transferred to the columns and weight inputs are transferred to the rows of the array 406.

The value loaders 402 can receive the activation inputs from a unified buffer, e.g., the unified buffer 308 of FIG. 3. Each value loader can send a corresponding activation input to a distinct left-most cell of the array 406. The left-most cell can be a cell along a left-most column of the array 406. For example, value loader 412 can send an activation input to cell 414. The value loader can also send the activation input to an adjacent value loader, and the activation input can be used at another left-most cell of the array 406. This allows activation inputs to be shifted for use in another particular cell of the array 406.

The weight fetcher interface 408 can receive the weight input from a memory unit, e.g., the dynamic memory 310 of FIG. 3. The weight fetcher interface 408 can send a corresponding weight input to a distinct top-most cell of the array 406. The top-most cell can be a cell along a top-most row of the array 406. For example, the weight fetcher interface 408 can send weight inputs to cells 414 and 416.

In some implementations, a host interface, e.g., the host interface 302 of FIG. 3, shifts activation inputs throughout the array 406 along one dimension, e.g., to the right, while shifting weight inputs throughout the array 406 along another dimension, e.g., to the bottom. For example, over one clock cycle, the activation input at cell 414 can shift to an activation register in cell 416, which is to the right of cell 414. Similarly, the weight input at cell 416 can shift to a weight register at cell 418, which is below cell 414.

On each clock cycle, each cell can process a given weight input and a given activation input to generate an accumulated output. The accumulated output can also be passed to an adjacent cell along the same dimension as the given weight input. An individual cell is described further below with reference FIG. 5.

The accumulated output can be passed along the same column as the weight input, e.g., towards the bottom of the column in the array 406. In some implementations, at the bottom of each column, the array 406 can include accumulator units 410 that store and accumulate each accumulated output from each column when performing calculations with layers having more weight inputs than columns or layers having more activation inputs than rows. In some implementations, each accumulator unit stores multiple parallel accumulations. The accumulator units 410 can accumulate each accumulated output to generate a final accumulated value. The final accumulated value can be transferred to a vector computation unit, e.g., the vector computation unit 214 of FIG. 2. In some other implementations, the accumulator units 410 passes the accumulated values to the vector computation unit without performing any accumulations when processing layers with fewer weight inputs than columns or layers having fewer activating inputs than rows.

Figure 5:
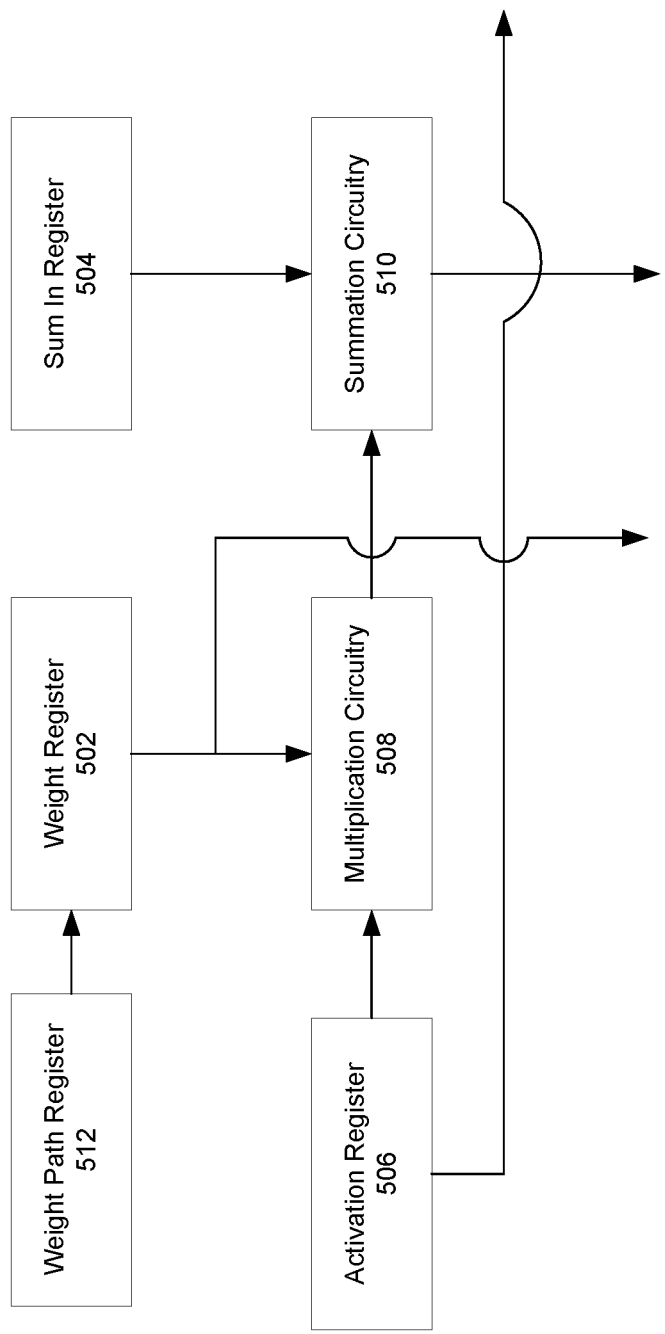
FIG. 5 shows an example architecture of a cell inside a systolic array.

FIG. 5 shows an example architecture 500 of a cell inside a systolic array, e.g., the systolic array 406 of FIG. 4.

The cell can include an activation register 506 that stores an activation input. The activation register can receive the activation input from a left adjacent cell, i.e., an adjacent cell located to the left of the given cell, or from a unified buffer, depending on the position of the cell within the systolic array. The cell can include a weight register 502 that stores a weight input. The weight input can be transferred from a top adjacent cell or from a weight fetcher interface, depending on the position of the cell within the systolic array. The cell can also include a sum in register 504. The sum in register 504 can store an accumulated value from the top adjacent cell. Multiplication circuitry 508 can be used to multiply the weight input from the weight register 502 with the activation input from the activation register 506. The multiplication circuitry 508 can output the product to summation circuitry 510.

The summation circuitry can sum the product and the accumulated value from the sum in register 504 to generate a new accumulated value. The summation circuitry 510 can then send the new accumulated value to another sum in register located in a bottom adjacent cell. The new accumulated value can be used as an operand for a summation in the bottom adjacent cell.

The cell can also shift the weight input and the activation input to adjacent cells for processing. For example, the weight register 502 can send the weight input to another weight register in the bottom adjacent cell. The activation register 506 can send the activation input to another activation register in the right adjacent cell. Both the weight input and the activation input can therefore be reused by other cells in the array at a subsequent clock cycle.

In some implementations, the cell also includes a control register. The control register can store a control signal that determines whether the cell should shift either the weight input or the activation input to adjacent cells. In some implementations, shifting the weight input or the activation input takes one or more clock cycles. The control signal can also determine whether the activation input or weight inputs are transferred to the multiplication circuitry 508, or can determine whether the multiplication circuitry 508 operates on the activation and weight inputs. The control signal can also be passed to one or more adjacent cells, e.g., using a wire.

In some implementations, weights are pre-shifted into a weight path register 512. The weight path register 512 can receive the weight input, e.g., from a top adjacent cell, and transfer the weight input to the weight register 502 based on the control signal. The weight register 502 can statically store the weight input such that as activation inputs are transferred to the cell, e.g., through the activation register 506, over multiple clock cycles, the weight input remains within the cell and is not transferred to an adjacent cell. Therefore, the weight input can be applied to multiple activation inputs, e.g., using the multiplication circuitry 508, and respective accumulated values can be transferred to an adjacent cell.

As described above, for a given neural network layer, the systolic array performs the operations for the layer using two-dimensional matrix multiplication.

In order to effectively perform convolution calculations using the systolic array, the neural network processor parallelizes matrix multiplications having large dimensional spaces, which are generally required for convolution calculations. In particular, the neural network processor can "flatten" matrices. By way of illustration, the neural network process can flatten a set of activation inputs. For example, the set of activation inputs can be represented as a 3D matrix. The 3D matrix can be visualized as a stack of 2D matrices. Each 2D matrix can then be sent to a row of the systolic array. Kernels can then be sent to columns of the systolic array, and the systolic array can then use the kernels to perform numerous calculations on each 2D matrix at once, thereby parallelizing a convolution computation. This will be described further below in reference to FIGS. 6-8.

Figure 6:
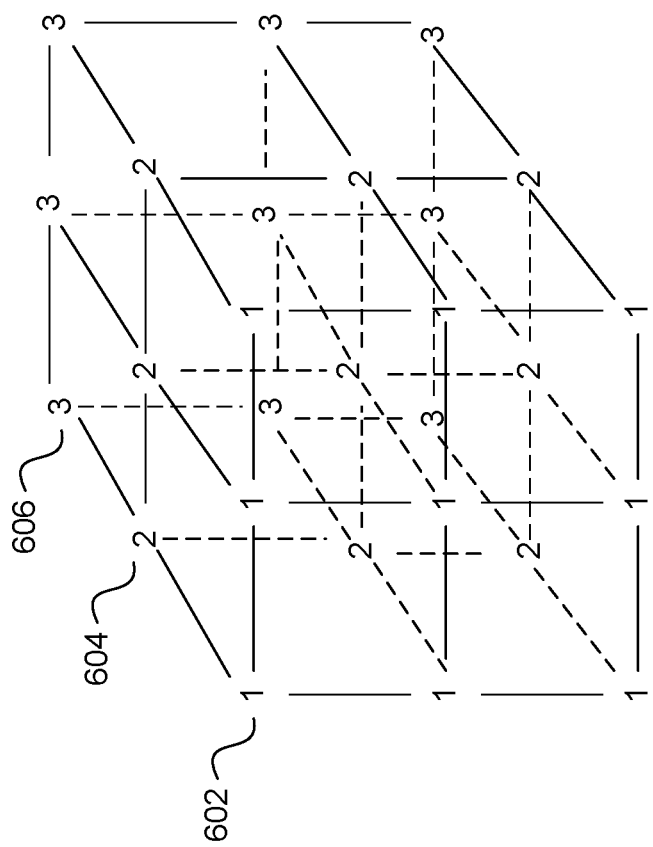
FIG. 6 shows an example matrix structure having spatial dimensions and a feature dimension.

FIG. 6 shows an example matrix structure 600 having spatial dimensions and a feature dimension. The matrix structure 600 can represent either a set of activation inputs or a set of weight inputs. A matrix structure for a set of activation inputs will be referred to in this specification as an activation matrix structure, and a matrix structure for a set of weight inputs will be referred to in this specification as a kernel matrix structure. The matrix structure 600 has three dimensions: two spatial dimensions and one feature dimension.

In some implementations, the spatial dimensions correspond to a space or position of a set of activation inputs. For example, if the neural network is processing an image, which has two dimensions, the matrix structures can have two spatial dimensions, which correspond to spatial coordinates, i.e., XY coordinates, of the image.

The feature dimension corresponds to features from an activation input. Each feature dimension can have depth levels; for example, the matrix structure 600 has depth levels 602, 604, and 606. By way of illustration, if matrix structure 600 represents a 3×3×3 image sent as a set of activation inputs to a first layer, the X and Y dimensions of the image (3×3) can be the spatial dimensions, and the Z dimension (3) can be the feature dimension corresponding to R, G, and B values. That is, depth level 602 can correspond to a feature of nine '1' activation inputs, e.g., red values, depth level 604 can correspond to a feature of nine '2' activation inputs, e.g., green values, and depth level 606 can correspond to a feature of nine '3' activation inputs, e.g., blue values.

Although only three depth levels for the feature dimension are illustrated in the example of FIG. 6, a given feature dimension can have a large number, e.g., hundreds, of feature dimensions. Similarly, although only one feature dimension is illustrated, a given matrix structure can have multiple feature dimensions.

In order to perform the computation for the convolutional layer, using the matrix structure 600, the system has to convert the convolutional computation to a two-dimensional matrix multiplication.

Figure 7:
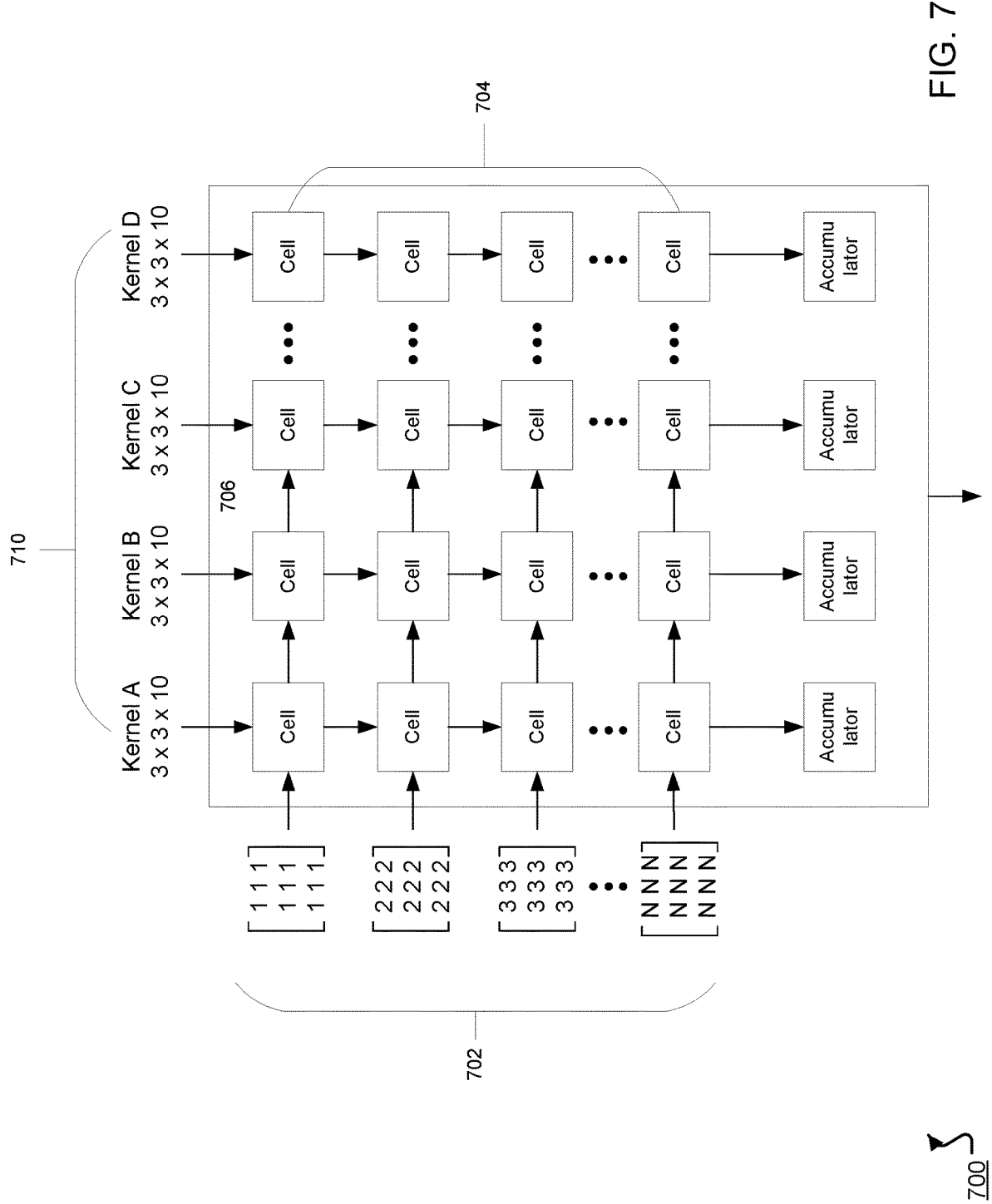
FIG. 7 shows an example illustration of how a kernel matrix structure is sent to a systolic array.

FIG. 7 shows an example illustration of how a matrix structure 600 of FIG. 6 is processed by a systolic array 706 at a given convolutional layer. The matrix structure 600 can be a set of activation inputs. Generally, the neural network processor can send the activation inputs, e.g., elements within matrix structure 600, and weight inputs, e.g., Kernels A-D 710, to rows and columns of the array, respectively. The activation and weight inputs can be shifted to the right and to the bottom, respectively, of the systolic array and must reach a particular position, e.g., a particular register at a particular cell. Once the inputs are determined to be in place, e.g., via control signals, the processor can perform calculations using the inputs stored within the cells to generate the given layer's output.

The neural network processor "flattens" the matrix structure 600 before sending portions of the structure 600 to rows of the systolic array, as described above. That is, the neural network processor can split up the depth layers 702 of the matrix structure 600, e.g., depth layers 602, 604, and 606 of FIG. 6, and send each depth layer to a distinct cell. In some implementations, each depth layer is sent to a cell on a different row of the systolic array 706. For example, the processor can send the activation inputs from a first depth layer, e.g., a matrix of nine '1' activation inputs, to a left-most cell at a first row of the systolic array 706, a second depth layer, e.g., a matrix of nine '2' activation inputs, to a left-most cell at a second row, a third depth layer, e.g., a matrix of nine '3' activation inputs, to a left-most cell at a third row, and so on.

The given layer can have multiple kernels, e.g., Kernels A-D 710. Kernels A-D 710 can have matrix structures of dimension 3×3×10. The processor can send each kernel matrix structure to a cell at a distinct column of the systolic array 706. For example, Kernel A can be sent to a top cell in a first column, Kernel B can be sent to a top cell in a second column, and so on.

When a matrix structure is sent to a cell, a first element of the matrix can be stored in the cell during one clock cycle. On the next clock cycle, a next element can be stored in the cell. The first element stored can be shifted to an adjacent cell, as described above in reference to FIG. 5. The shifting of inputs can continue until all elements of the matrix structure are stored in the systolic array 706. Both activation inputs and weight inputs can be shifted throughout each cell after one or more clock cycles. Shifting of the inputs within the systolic array will be described further below in reference to FIG. 8.

In some implementations, the systolic array 706 has a large number of rows and a large number of columns, e.g., 256 rows and 256 columns. If a given layer of the neural network has a fewer sets of weight inputs than columns in the systolic array 706, the processor can replicate one or more matrix structures for the sets of weight kernels and send the replicated matrix structures to unused columns of the array 706. If the given layer has a fewer sets of activation inputs than columns in the array, the processor can replicate one or more matrix structures for the sets of activation inputs and send the replicated matrix structures to unused rows of the array 706. By replicating sets of activation inputs or sets of weight inputs, or both, the processor can perform multiple convolution calculations in parallel.

Figure 8:
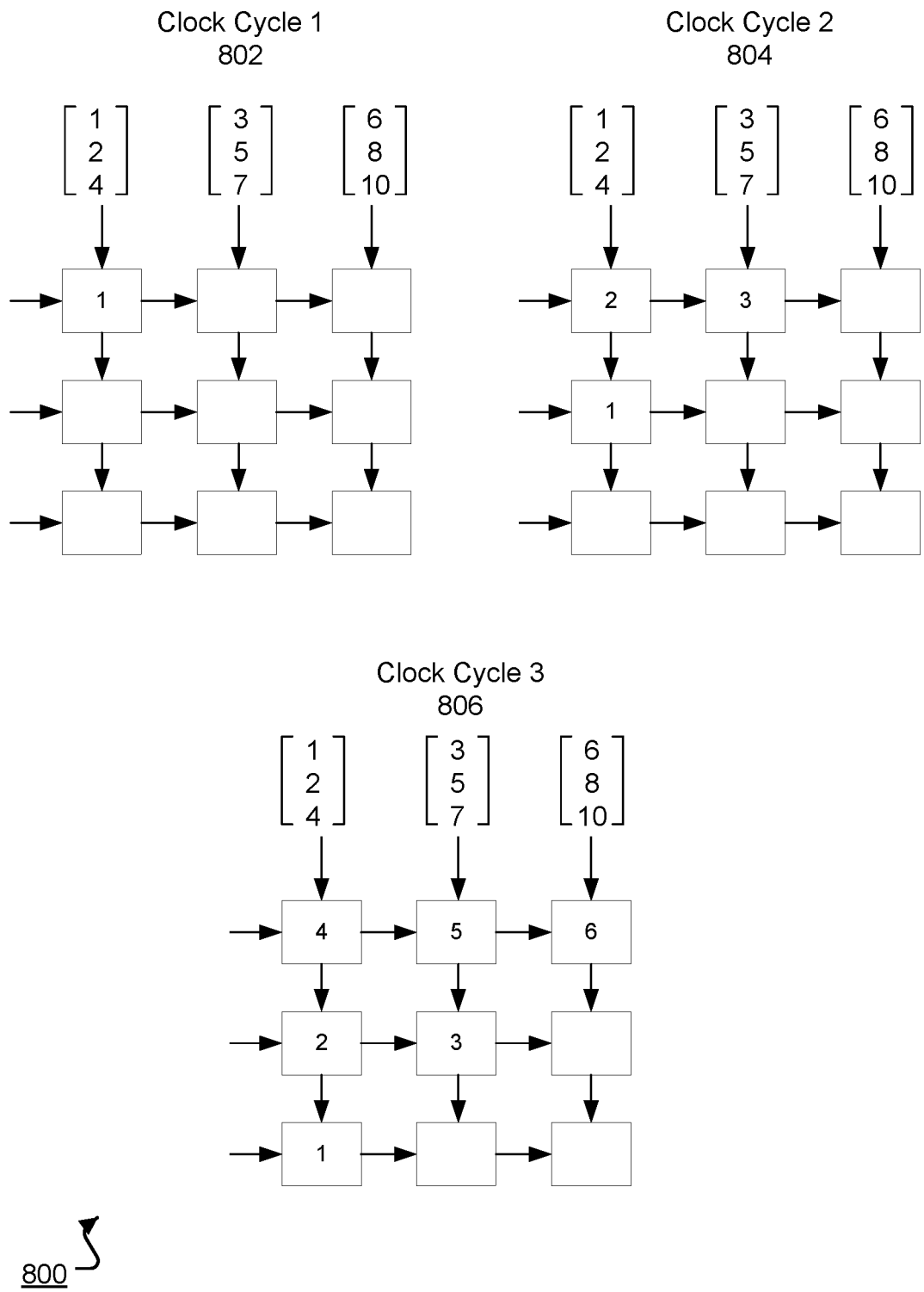
FIG. 8 shows an example illustration of weight inputs inside cells after three clock cycles.

FIG. 8 shows an example illustration 800 of weight inputs inside cells of an example 3×3 systolic array after three clock cycles. Each cell can store a weight input and an activation input, as described above in reference to FIG. 5. Weight inputs can be sent to cells at distinct columns of the systolic array for convolution calculations, as described above in reference to FIG. 7. By way of illustration, the system sends a first kernel matrix structure having weight inputs of 1, 2, and 4 to a first column of the systolic array. The system sends a second kernel structure having weight inputs of 3, 5, and 7 to a second column. The system sends a third kernel structure having weights 6, 8, and 10 to a third column. After every clock cycle, weight inputs can be shifted in one dimension, e.g., from top to bottom, while activation inputs can be shifted (not illustrated) in another dimension, e.g., from left to right.

Weight inputs can be stored within cells in a staggered manner. That is, a state of the systolic array after a first clock cycle 802 shows a '1' inside a top-left cell. The '1' represents the weight input of '1' stored in the cell. At the next clock cycle 804, the '1' is shifted to a cell under the top-left cell, and another weight input from the kernel, '2', is stored in the top-left cell as well as a weight input of '3' at a top-most cell at a second column.

On a third clock cycle, 806, each weight is shifted again. In the first column, a bottom-most cell stores the '1' weight input, the '2' weight input is stored where the '1' weight input was stored on the previous cycle, and a '4' weight input is stored in the top-left most cell. Similarly, in the second column, the '3' is shifted down and a '5' weight input is stored in the top-middle cell. In the third column, a '6' weight input is stored in the top-right most cell.

In some implementations, a control signal for the weight inputs that determines whether the weight inputs should be shifted is also shifted along with the weight inputs.

Activation inputs can be shifted in a similar fashion in the other dimension, e.g., from left to right.

Once the activation inputs and the weight inputs are in place, the processor can perform a convolution calculation, e.g., by using the multiplication and summation circuitries within the cells, to generate a set of accumulated values to be used in a vector computation unit.

Although the system has been described with weight inputs being sent to columns of the array and activation inputs being sent to rows of the array, in some implementations, the weight inputs are sent to rows of the array and the activation inputs are sent to columns of the array.

In some implementations, a neural network model has a stride parameter greater than one. The processor can perform computations with the stride parameter by converting matrix structures of activation input and weight inputs to respective permuted matrix structures having a larger feature dimension and smaller spatial dimensions.

In some implementations, when processing images, the processor permutes, i.e., remaps, the activation matrix structure to have the following size: CEIL(X/X_stride)×CEIL(Y/Y_stride)×(Sizeof(RGB)*X_stride*Y_stride), where X and Y are the size of the matrix structure dimensions, X_stride and Y_stride are the stride parameters, and Sizeof(RGB) is three. The kernel matrix structure can also be permuted using the same formula. For example, if the stride parameter is 2×2, the activation matrix structure is originally 170×170×3 and the kernel matrix structure is 7×7×3, the permuted activation matrix structure can be 85×85×12 and the permuted kernel matrix structure can be 4×4×12.

The coordinates of the activation and kernel matrix structures can be mapped to permuted coordinates using the following formula: [CEIL(X/2), CEIL(Y/2), Z+3*(X % 2)+6*(Y % 2)], where X, Y, and Z represent a coordinate in the respective matrix structure. Other formulas can include [CEIL(X/2), CEIL(Y/2), Z+3*(Y % 2)+6*(X % 2)] or [CEIL(X/2), CEIL(Y/2), 2*Z+(X % 2)+6*(Y % 2)].

Figure 9:
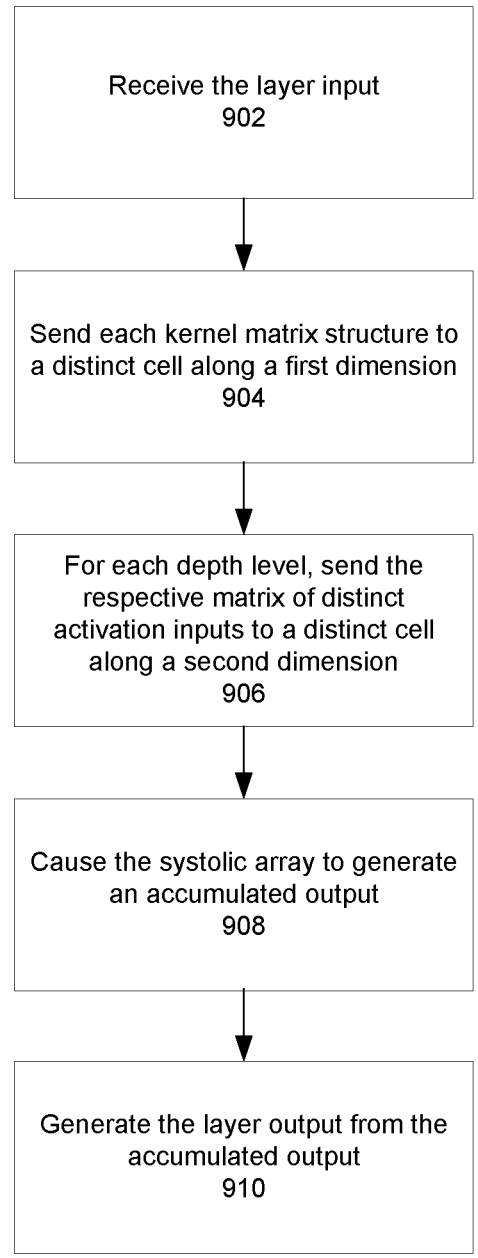
FIG. 9 is a flow diagram of an example method for computing a layer output for a convolutional neural network layer.

FIG. 9 is a flow diagram of an example method for computing a layer output for a convolutional neural network layer. For convenience, the method 900 will be described with respect to a system having one or more circuits that performs the method 900, e.g., the circuit 300 of FIG. 3. The process 900 can be performed for each convolutional layer of the neural network in order to compute an inference from a received input.

As described above, a convolutional neural network layer can have a set of kernels, and each kernel can be represented as a matrix structure of weights.

The system can receive a layer input, e.g., data from an image, (step 902). The layer input can be represented as a multi-dimensional matrix having multiple depth levels, as described above in matrix structure 600 of FIG. 6.

The system can send each kernel matrix structure to a distinct cell along a first dimension of a systolic array within the system (step 904). In some implementations, cells along the first dimension are cells located along columns of the array. For example, a given kernel matrix structure can be converted to a vector of elements, and each element can be shifted through a column of the systolic array as described above in reference to FIG. 8.

The system can, for each depth level, send the respective matrix of distinct activation inputs to a distinct cell along a second dimension of the systolic array (step 906). This is described above in reference to FIG. 7. In some implementations, the distinct cells along the second dimension are cells located along rows of the array. Activation inputs at a particular depth level can be converted into a vector of elements, and each element can be shifted through a row of the systolic array as described above in reference to FIG. 8.

The system can cause the systolic array to generate an accumulated output from the respective matrices sent to the cells (step 908), as described above in reference to FIG. 4.

The system can generate the layer output from the accumulated output (step 910), as described above in reference to FIGS. 3-4.

Generally, data rotations is a concept of shifting data around to enable the circuit to perform flattened convolutional calculations while maximizing utilization of the circuit. The circuit can rotate data, an example of which will be described below in reference to FIG. 10, and direct dataflow of the rotated data to the systolic array such that dot products computed over the course of a few clock cycles generates a set of accumulated values that, for example, normally would take numerous magnitudes of clock cycles to compute using a single-threaded processor architecture.

Figure 10:
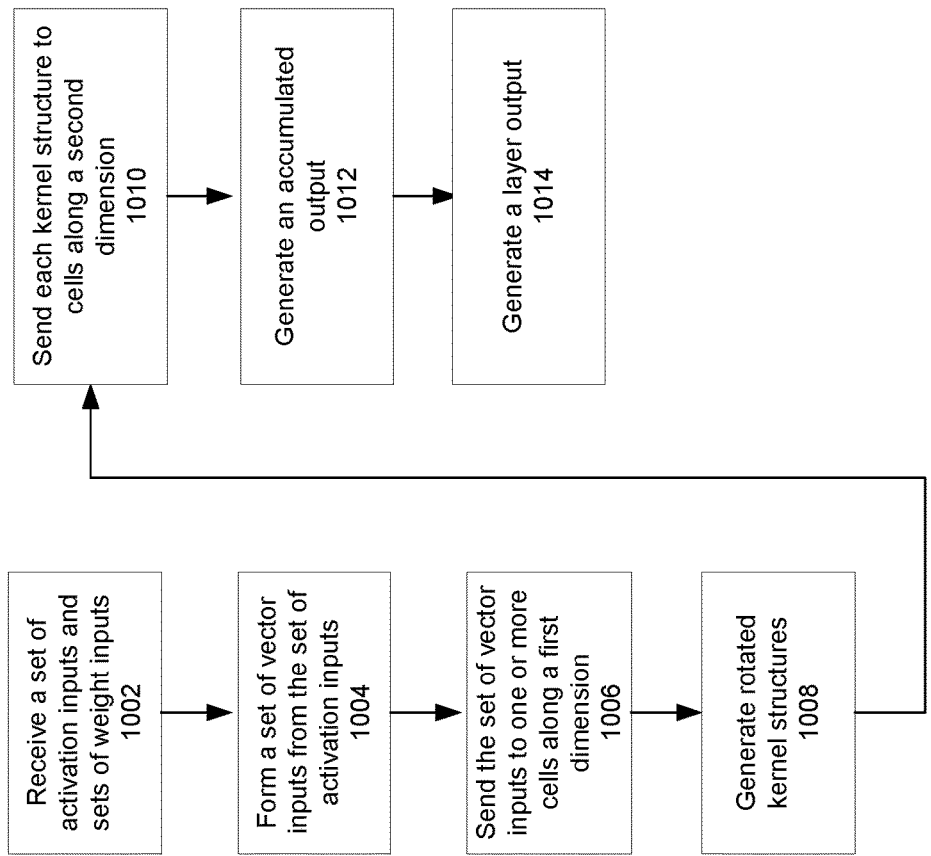
FIG. 10 is a flow diagram of an example method for performing a computation for a given layer of a neural network using data rotations.

FIG. 10 is a flow diagram of an example method for performing a computation for a given layer of a neural network using data rotations. For convenience, the method 1000 will be described with respect to a system having one or more circuits that performs the method 1000.

The system receives a set of activation inputs and sets of weight inputs (step 1002). The activation and weight inputs can be received at a two-dimensional systolic array from a unified buffer and a dynamic memory unit, as described above in reference to FIG. 3. The set of activation inputs and each set of weight inputs can be represented as a multi-dimensional matrix structure as described above in reference to FIG. 6.

Figure 11:
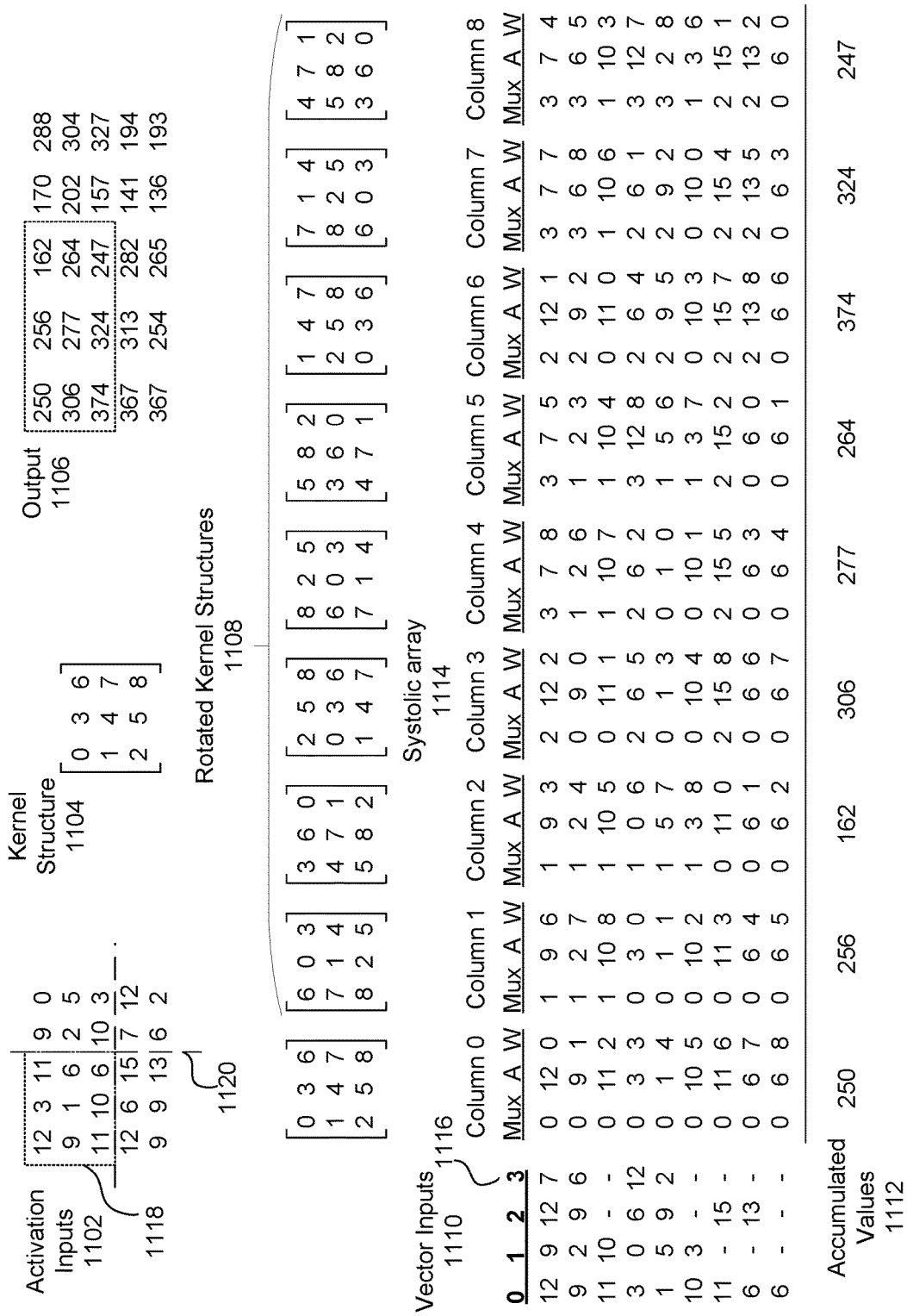
FIG. 11 is an example illustration of how rotated kernel matrix structures are used to compute convolution calculations.

FIG. 11 is an example 1100 of how rotated kernel matrix structures are used to compute convolution calculations using a two-dimensional systolic array 1114. As shown in the example of FIG. 11, the received set of activation inputs can be activation inputs 1102, i.e., a 5×5 matrix of activation inputs, and an example set of weight inputs can be kernel structure 1104. For simplicity, the example 1100 illustrates how a convolution calculation can be performed at a first layer of a neural network using a two-dimensional image and a two-dimensional kernel. The first layer can receive a 170×170 set of activation inputs, e.g., an image, and the first layer can have a kernel of weight inputs represented as a 3×3 kernel matrix structure 1104, i.e., a kernel with 3×3 spatial dimensions. The example 1100 illustrates a two dimensional weight rotation.

In some implementations, instead of receiving the set of activation inputs, the system determines the set of activation inputs by selecting the set of activation inputs from a larger set of activation inputs. The set of activation inputs, i.e., the 5×5 portion, can be selected based on dimensions of the kernel to be applied to the set of activation inputs. For example, the system can choose to process the 170×170 image by dividing the image into 5×5 portions, e.g., 5×5 activation inputs 1102 because the 5×5 portion is used to calculate convolutions using a 3×3 kernel structure.

In particular, when calculating convolutions, i.e., accumulated values, for a single element, the system overlays the kernel structure 1104 over the set of activation inputs and computes a dot product using the overlapped elements. For example, to compute a convolution for the top-left most element 12, the system uses all elements inside quadrant 1118. Similarly, to calculate convolutions for the bottom three and right most three elements in quadrant 1118, the 3×3 kernel matrix structure 1104 overlaps with elements within a 5×5 portion of activation inputs 1102.

Returning to the description of FIG. 10, the system forms sets of vector inputs from the set of activation inputs (step 1004). The system can use dimensions of a kernel matrix structure, e.g., 3×3 kernel structure 1104 of FIG. 11, for the set of weight inputs to identify the sets of vector inputs. In particular, the system can overlap the kernel matrix structure onto a portion of the activation inputs, e.g., 3×3 kernel structure 1104 overlaps a quadrant 1108 of activation inputs 1102.

Based on the overlapped portion, the system can divide the activation inputs 1102 into four quadrants, e.g., see axis 1120. In particular, the quadrants can be positioned over the activation inputs 1102 such that at least one quadrant overlaps with the kernel matrix structure, e.g., the quadrant 1118 overlaps with a 3×3 kernel structure dimension, but the other three quadrants do not.

Elements from each quadrant can be used to form a vector input. By way of illustration, activation inputs 1102 are divided into four sets of vector inputs 1110: [12, 9, 11, 3, 1, 10, 11, 6, 6], [9, 2, 10, 0, 5, 3], [12, 9, 6, 9, 15, 13], [7, 6, 12 2]. In some implementations, the vector inputs can be ordered by reading in the elements in a quadrant in a top-to-bottom, then left-to-right direction.

In some implementations, the elements can be padded, e.g., with 0's if the quadrant has fewer elements than a number of elements in the kernel. For example, a particular quadrant can have activation inputs represented in a 2×3 matrix:

$$\begin{bmatrix} 12 & 6 & 15 \\ 9 & 9 & 13 \end{bmatrix}.$$

The 2×3 matrix can be padded to match dimensions of kernel structure 1104, i.e., a 3×3 matrix:

$$\begin{bmatrix} 12 & 6 & 15 \\ 9 & 9 & 13 \\ 0 & 0 & 0 \end{bmatrix}.$$

The circuit can then read the elements in a top-to-bottom, then left-to-right direction to form a set of vector inputs, e.g., see Vector Inputs 1110 under the MUX value of 2: [12 9-6 9-15 13-].

In some implementations, instead of being divided into quadrants, the activation inputs are divided into X regions, where X=2^n, and where n is the number of dimensions of the kernel matrix structure. The system can then generate a set of vector inputs from elements in each region.

Returning to the description of FIG. 10, the system sends the sets of vector inputs to one or more cells along a first dimension of the systolic array, e.g., row cells (step 1006). In some implementations, the system first sends the sets of vector inputs to value loaders that are adjacent to the systolic array, e.g., the value loaders described in reference to FIG. 4. Each value loader can store multiple activation inputs and select one activation input to be sent to a cell along the first dimension based on a selector determined by the system, e.g., a multiplexor control signal. For example, if there are four sets of vector inputs, a given value loader can store four activation inputs, i.e., one activation input from each set of vector inputs.

As shown in the example of FIG. 11, the four sets of vector inputs 1110: [12, 9, 11, 3, 1, 10, 11, 6, 6], [9, 2, 10, 0, 5, 3], [12, 9, 6, 9, 15, 13], [7, 6, 12 2] can be sent to value loaders of the systolic array 1114. Each value loader can include a multiplexor that receives the four vector inputs and a control signal.

Based on which activation input should be sent to the respective row cell of the given value loader to complete the convolution calculation, the system can determine an appropriate multiplexor control signal, which can be generated by the neural network processor to cause the value loader to send the appropriate activation input to the respective row cell.

As an example, in FIG. 11, the multiplexor control signal can determine which element of which vector is sent to the value loader's corresponding row cell and thereby used in the current operation. The circuit, e.g., a host 202 of FIG. 2, can select the multiplexor control signal based on what remaining products need to be computed for a given convolution calculation.

For example, for simplicity, consider activation input A and weight input B. Since both activation inputs and weight inputs are loaded into the systolic array 1114 in a staggered fashion, as described above with reference to FIG. 8, when computing a product of A and B as part of a convolution calculation, the system selects a multiplexor signal value that places A in the same cell as B at the particular clock cycle during which the product will be computed. The system can select multiplexor signal values, e.g., values 1116, to calculate convolutions for each element of each vector.

In some implementations, after one clock cycle, the activation inputs in the value loader are shifted to an adjacent value loader that corresponds to an adjacent row. This allows the elements in the vector inputs to shift to different rows of the systolic array, thereby exposing the elements for use in other rows. That is, if element 12 in the vector formed by quadrant 1118 is not used in the first row by any column, the element 12 can be shifted to an adjacent row on a subsequent clock cycle, and can be selected by a multiplexor signal for use in a cell at a particular column in the systolic array. In some implementations, shifting of elements of each vector input across value loaders, thereby rotating the elements across rows, is referred to as value rotations.

In some implementations, the staggered loading of the activation inputs, e.g., over multiple clock cycles, based on multiplexor control signals is referred to as temporally rotating the activation inputs.

Returning to the description of FIG. 10, the system generates rotated kernel matrix structures for each set of weight inputs (step 1008). Each set of weight inputs is represented as a kernel matrix structure. A kernel matrix structure can be rotated by shifting elements in the kernel matrix structure along one dimension. For example, the dimension can be in the X-dimension, the Y-dimension, or the Z-dimension.

For example, in the example of FIG. 11, the neural network processor can generate rotated kernels 1108 from the kernel 1104. This can be referred to as spatially rotating the given kernel. For example, the processor can shift elements of the kernel structure along either an X-dimension or a Y-dimension. That is, elements of kernel structure 1104

$$\begin{bmatrix} 0 & 3 & 6 \\ 1 & 4 & 7 \\ 2 & 5 & 8 \end{bmatrix}$$

can be shifted left or right and top or bottom to generate eight rotated kernel structures 1108 for a total of nine kernel structures. If the kernel structure had a size of 4×4, the processor can generate 16 rotations, i.e., 4*4. If the kernel structure had a size of 3×3×3, the processor can generate 27 rotations, i.e., 3*3*3.

In some implementations, the processor uses stride in value rotations by varying how fast activation inputs move down rows of the array. For example, activation inputs can be shifted more than one row per clock cycle.

In some implementations, the processor generates partial data rotations. That is, instead of generating all possible rotations, the processor generates some of the possible rotations for use on a first pass of the array and a remainder of the possible rotations for use on a subsequent pass of the array. For example, instead of generating eight rotated kernel structures 1108, the processor generates four for use on a first pass and another four for use on a second pass. The processor can generate some of the possible rotations in situations where there are more possible rotations than unused columns of the array.

Returning to the description of FIG. 10, the system sends each kernel matrix structure, rotated and un-rotated, to cells along a second dimension of the systolic array, e.g., column cells (step 1010). In FIG. 11, the kernel structure 1104 and each rotated kernel structure can be sent to distinct column cells of the systolic array 1114. Each row of numbers under a column represent a multiplexor (MUX) control signal, an activation input (A), and a weight input (W). The numbers for the activation input and the weight input can represent values stored within registers of a cell in the systolic array 1114.

By way of illustration, a total of nine kernel structures are sent to nine different columns of the systolic array 1114. Each kernel structure has nine weight input elements, which are stored in nine rows of the systolic array, e.g., in a staggered fashion as described in reference to FIG. 8. Activation input elements from the sets of vector inputs 1110 are stored in particular cells based on the control signal delivered to the MUX. The control signals can be preprogrammed into the neural network processor. For example, the first row of Column 0 has a MUX value of 0. Therefore, the systolic array 1114 can select a value from the vector inputs 1110 corresponding to the first row and the MUX value of 0, i.e., the first element from vector input [12, 9, 11, 3, 1, 10, 11, 6, 6]. The first row of Column 1 has a MUX value of 1. Therefore, the systolic array 1114 can select a value from the vector inputs 1110 corresponding to the first row and the MUX value of 1, i.e., the first element from vector input [9, 2, 10, 0, 5, 3].

Returning to the description of FIG. 10, the system generates accumulated outputs from the systolic array (step 1012). In some implementations, the systolic array computes a dot product of the weight and activation inputs stored in its cells. In the example of FIG. 11, when both the activation inputs and weight inputs are stored in the appropriate cells, e.g., made possible by the MUX signals, the systolic array 1114 performs a dot product of the activation and weight inputs on a per column basis to generate accumulated values 1112, e.g., using multiplication and summation circuitry within cells of the systolic array. The accumulated values 1112 can form an output 1106, which can be sent to a vector computation unit, which is described above in reference to FIG. 2.

For example, for Column 0, the systolic array 1114 can perform a dot product using the kernel $$\begin{bmatrix} 0 & 3 & 6 \\ 1 & 4 & 7 \\ 2 & 5 & 8 \end{bmatrix}$$

and the activation input from vector [12, 9, 11, 3, 1, 10, 11, 6, 6]. Other sets of vector inputs are not used in Column 0 because the corresponding MUX value is 0. Therefore, the systolic array computes an accumulated value of 250 for column 0 by performing a dot product, i.e., 12*0+9*1+11*2+3*3+1*4+10*5+11*6+6*7+6*8=250.

Returning to the description of FIG. 10, the system generates a layer output from the accumulated outputs (step 1014). The accumulated outputs can be sent to a vector computation unit, e.g., the vector computation unit described in reference to FIG. 3. The vector computation unit can process the accumulated outputs and generate the layer output, e.g., as described above in reference to FIG. 2. The layer output can be sent and stored at the unified buffer.

The systolic array continues the convolution calculations over the entire set of activation inputs, i.e., the entire 170×170 image. In some implementations, the convolution calculations are performed in a pseudo-rasterized order. That is, because convolution calculations are performed in parallel, performing convolution calculations in a normal raster order can cause convolution calculations to be repeated, which would be inefficient. Instead, the neural network processor can proceed in an order from left to right, top to down order that skips convolution calculations that have already been performed in previous parallel convolution calculations. In effect, the processor can output chunks at a time, as opposed to single outputs in a normal raster order.

In some implementations, a subset of the rotated kernel structures are generated and a subset of vector inputs are sent to the systolic array if there are not enough unused columns or rows, respectively. The remaining rotated kernel structures and remaining vector inputs can be sent to the systolic array on a subsequent pass. In some implementations, the rotated kernel structures, the vector inputs, or both, are replicated for use in other unused columns of the systolic array 1114 similarly described above in reference to FIG. 7. That is, the kernel structures and the vector inputs can be replicated and sent to unused columns and rows, respectively, of the systolic array for calculations to be performed in parallel.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To send for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can send input to the computer. Other kinds of devices can be used to send for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method for performing computations for a layer of a neural network using a hardware array of compute cells in a hardware integrated circuit configured to implement the neural network, the method comprising:
   receiving an input data that flows through the hardware integrated circuit along a particular dimension of the hardware array of compute cells;
   obtaining a multi-dimensional matrix structure comprising operands of the input data by reading the operands from a memory of the integrated circuit; and
   performing a convolution between operands of the multi-dimensional matrix structure and a kernel for the neural network layer, comprising:
      rotating the multi-dimensional matrix structure across a first dimension of the hardware array; and
      performing, by the hardware array, the convolution using operands from the rotated multi-dimensional matrix structure and the kernel for the neural network layer.

2. The method of claim 1, wherein the hardware array comprises an array of multiplication circuits and performing the convolution comprises:
   performing, by the array of multiplication circuits, multiplication operations between operands of the multi-dimensional matrix structure and a weight input of the kernel.

3. The method of claim 1, wherein:
   the multi-dimensional matrix structure is a matrix structure of activation inputs; and the kernel is one of a plurality of kernels, each of the plurality of kernels being a matrix structure of weight inputs for one or more layers of the neural network.

4. The method of claim 3, further comprising:
converting the matrix structure of activation inputs to a first permuted matrix structure; and
converting at least one matrix structure of weight inputs to a second permuted matrix structure.

5. The method of claim 1, wherein performing, by the hardware array, the convolution using operands from the rotated multi-dimensional matrix structure and the kernel for the neural network layer produces a plurality of accumulation values, wherein the method comprises applying an activation function to the plurality of accumulated values to produce a layer output.

6. The method of claim 5, comprising storing the layer output in a buffer as an input to a subsequent layer in the neural network.

7. The method of claim 1, comprising receiving instructions at a host interface, wherein the instructions comprise one or more of a number of layers of the neural network to process, corresponding input and output sizes for each layer of the neural network, a stride value, and a type of layer to be processed.

8. The method of claim 7, comprising sending the instructions to a sequencer, wherein the sequencer converts the instructions into control signals.

9. The method of claim 8, comprising sending at least one control signal from the sequencer to a direct memory access engine.

10. The method of claim 8, comprising generating, by the sequencer, clocked signals.

11. The method of claim 1, wherein rotating the multi-dimensional matrix structure comprises shifting a first set of operands in a first value loader to a second value loader.

12. The method of claim 11, wherein shifting occurs after a single clock cycle.

13. The method of claim 1, comprising rotating the kernel.

14. The method of claim 13, wherein performing the convolution comprises performing the convolution using the operands from the rotated multi-dimensional matrix structure and weights from the rotated kernel.

15. The method of claim 13, wherein performing the convolution comprises performing the convolution using the operands from the rotated multi-dimensional matrix structure and a subset of the rotated kernel.

* * * * *